United States Patent
Nakada et al.

(10) Patent No.: US 11,102,364 B2
(45) Date of Patent: Aug. 24, 2021

(54) INCLINATION DETECTING DEVICE, READING DEVICE, IMAGE PROCESSING APPARATUS, AND METHOD OF DETECTING INCLINATION

(71) Applicants: Yuuki Nakada, Kanagawa (JP); Hajime Tsukahara, Kanagawa (JP); Hiroki Shirado, Kanagawa (JP); Ayumu Hashimoto, Kanagawa (JP); Tomohiko Ono, Kanagawa (JP); Tatsuya Ozaki, Kanagawa (JP); Hiroshi Kubo, Kanagawa (JP); Yoshiaki Nagao, Kanagawa (JP); Kimiharu Yanagisawa, Tokyo (JP); Masahiro Itoh, Kanagawa (JP)

(72) Inventors: Yuuki Nakada, Kanagawa (JP); Hajime Tsukahara, Kanagawa (JP); Hiroki Shirado, Kanagawa (JP); Ayumu Hashimoto, Kanagawa (JP); Tomohiko Ono, Kanagawa (JP); Tatsuya Ozaki, Kanagawa (JP); Hiroshi Kubo, Kanagawa (JP); Yoshiaki Nagao, Kanagawa (JP); Kimiharu Yanagisawa, Tokyo (JP); Masahiro Itoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 55 days.

(21) Appl. No.: 16/776,521

(22) Filed: Jan. 30, 2020

(65) Prior Publication Data
US 2020/0252513 A1    Aug. 6, 2020

(30) Foreign Application Priority Data

Jan. 31, 2019 (JP) .............................. JP2019-016466

(51) Int. Cl.
*H04N 1/04* (2006.01)
*H04N 1/00* (2006.01)

(52) U.S. Cl.
CPC ..... *H04N 1/00718* (2013.01); *H04N 1/00734* (2013.01); *H04N 1/00748* (2013.01); *H04N 1/00779* (2013.01)

(58) Field of Classification Search
CPC ........... H04N 1/00718; H04N 1/00745; H04N 1/00753; H04N 1/0075; H04N 1/00779; H04N 1/00726
(Continued)

(56) References Cited

U.S. PATENT DOCUMENTS

| 6,091,927 A | 7/2000 | Hattori et al. |
| 2002/0054374 A1 | 5/2002 | Inoue et al. |

(Continued)

FOREIGN PATENT DOCUMENTS

| JP | 2000-349980 | 12/2000 |
| JP | 2017-112412 | 6/2017 |
| JP | 2018-157417 | 10/2018 |

OTHER PUBLICATIONS

U.S. Appl. No. 16/654,007, filed Oct. 16, 2019, Hiroshi Kubo, et al.
(Continued)

*Primary Examiner* — Cheukfan Lee
(74) *Attorney, Agent, or Firm* — Xsensus LLP

(57) ABSTRACT

An inclination detecting device includes processing circuitry. The processing circuitry is configured to detect, in image information that is an image of an object imaged by an imaging device at an imaging position where a background member forms a background, a first boundary between the background member and a shadow of the object at detection positions in at least one of main-scanning and sub-scanning directions on an outline of the object; detect a
(Continued)

second boundary between the object and the shadow of the object at detection positions in at least one of the main-scanning and sub-scanning directions on the outline of the object in the image information; detect a boundary group including detection results of the second boundary at the detection positions; and detect an inclination of the object in the image information from detection results of the first boundary, the second boundary, and the boundary group.

10 Claims, 15 Drawing Sheets

(58) Field of Classification Search
USPC .................................................. 358/488, 496
See application file for complete search history.

(56) References Cited

U.S. PATENT DOCUMENTS

| | | | |
|---|---|---|---|
| 2002/0109864 A1 | 8/2002 | Nishikino et al. | |
| 2002/0114645 A1 | 8/2002 | Takahashi et al. | |
| 2002/0191996 A1 | 12/2002 | Nishikino et al. | |
| 2003/0049051 A1 | 3/2003 | Takahashi et al. | |
| 2003/0095813 A1 | 5/2003 | Nishikino et al. | |
| 2003/0103781 A1 | 6/2003 | Takahashi et al. | |
| 2004/0004319 A1 | 1/2004 | Hattori et al. | |
| 2005/0067944 A1 | 3/2005 | Masuda et al. | |
| 2005/0095034 A1 | 5/2005 | Takahashi et al. | |
| 2005/0179963 A1 | 8/2005 | Nagano et al. | |
| 2005/0200737 A1 | 9/2005 | Shinohara et al. | |
| 2007/0121176 A1 | 5/2007 | Yamazaki et al. | |
| 2007/0216915 A1 | 9/2007 | Tsukahara | |
| 2008/0024842 A1 | 1/2008 | Tsukahara et al. | |
| 2008/0068467 A1 | 3/2008 | Kanno et al. | |
| 2008/0106748 A1 | 5/2008 | Tsukahara et al. | |
| 2008/0212146 A1 | 9/2008 | Tsukahara et al. | |
| 2008/0218724 A1 | 9/2008 | Nishina et al. | |
| 2008/0231917 A1 | 9/2008 | Tsukahara | |
| 2008/0278779 A1 | 11/2008 | Nishina et al. | |
| 2008/0297862 A1 | 12/2008 | Tsukahara | |
| 2009/0015709 A1 | 1/2009 | Kimura et al. | |
| 2009/0213440 A1 | 8/2009 | Nishina et al. | |
| 2009/0237750 A1 | 9/2009 | Tatsuno et al. | |
| 2009/0316039 A1 | 12/2009 | Yoshida et al. | |
| 2009/0323139 A1 | 12/2009 | Itoh et al. | |
| 2010/0007929 A1 | 1/2010 | Ono et al. | |
| 2010/0020367 A1 | 1/2010 | Abe et al. | |
| 2010/0027079 A1 | 2/2010 | Nishina et al. | |
| 2010/0027081 A1 | 2/2010 | Sano et al. | |
| 2010/0142009 A1 | 6/2010 | Tsukahara et al. | |
| 2010/0214630 A1 | 8/2010 | Takaura et al. | |
| 2010/0225983 A1 | 9/2010 | Fujii et al. | |
| 2011/0026085 A1 | 2/2011 | Tsukahara et al. | |
| 2011/0109945 A1 | 5/2011 | Tsukahara | |
| 2011/0176186 A1* | 7/2011 | Kanaya ............. | H04N 1/00753 358/498 |
| 2012/0002252 A1 | 1/2012 | Kubo et al. | |
| 2012/0026550 A1 | 2/2012 | Tsukahara | |
| 2012/0057210 A1 | 3/2012 | Tsukahara et al. | |
| 2012/0057211 A1 | 3/2012 | Shirado | |
| 2013/0215481 A1 | 8/2013 | Hayasaka et al. | |
| 2013/0215482 A1 | 8/2013 | Takaura et al. | |
| 2013/0242359 A1 | 9/2013 | Heishi et al. | |
| 2013/0242362 A1 | 9/2013 | Nakayama et al. | |
| 2013/0293932 A1 | 11/2013 | Sugai et al. | |
| 2014/0043629 A1 | 2/2014 | Shirado | |
| 2014/0043662 A1 | 2/2014 | Nakayama et al. | |
| 2014/0071501 A1 | 3/2014 | Shinkawa et al. | |
| 2014/0078560 A1 | 3/2014 | Nagao et al. | |
| 2014/0093177 A1* | 4/2014 | Hayashi ............. | H04N 1/00753 382/199 |
| 2014/0177012 A1 | 6/2014 | Kubo et al. | |
| 2014/0376808 A1 | 12/2014 | Hashimoto | |
| 2015/0092994 A1 | 4/2015 | Masuda et al. | |
| 2015/0256701 A1 | 9/2015 | Kimura et al. | |
| 2015/0264194 A1 | 9/2015 | Kubo et al. | |
| 2015/0334273 A1 | 11/2015 | Yanagisawa | |
| 2015/0365553 A1 | 12/2015 | Sugai et al. | |
| 2016/0028920 A1 | 1/2016 | Hashimoto | |
| 2016/0119495 A1 | 4/2016 | Konno et al. | |
| 2016/0170564 A1 | 6/2016 | Masuda et al. | |
| 2016/0198059 A1 | 7/2016 | Kubo et al. | |
| 2016/0219163 A1 | 7/2016 | Shirado et al. | |
| 2017/0019547 A1 | 1/2017 | Ozaki | |
| 2017/0019567 A1 | 1/2017 | Konno et al. | |
| 2017/0126929 A1* | 5/2017 | Noro .................... | H04N 1/3878 |
| 2017/0171428 A1* | 6/2017 | Kawano ............. | H04N 1/00737 |
| 2017/0244853 A1 | 8/2017 | Yabuuchi et al. | |
| 2017/0264782 A1 | 9/2017 | Hashimoto | |
| 2017/0295298 A1 | 10/2017 | Ozaki et al. | |
| 2017/0302821 A1 | 10/2017 | Sasa et al. | |
| 2018/0139345 A1 | 5/2018 | Goh et al. | |
| 2018/0146150 A1 | 5/2018 | Shirado et al. | |
| 2018/0175096 A1 | 6/2018 | Inoue et al. | |
| 2018/0213124 A1 | 7/2018 | Yokohama et al. | |
| 2019/0260892 A1 | 8/2019 | Kawai et al. | |
| 2020/0120225 A1* | 4/2020 | Oyama .............. | H04N 1/00708 |
| 2020/0137262 A1* | 4/2020 | Kubo ................. | H04N 1/00588 |
| 2020/0244837 A1* | 7/2020 | Tsukahara .......... | H04N 1/00092 |
| 2020/0296255 A1* | 9/2020 | Hashimoto ........ | H04N 1/00748 |

OTHER PUBLICATIONS

U.S. Appl. No. 16/589,329, filed Oct. 1, 2019, Tadaaki Oyama, et al.
U.S. Appl. No. 16/589,258, filed Oct. 1, 2019, Tatsuya Ozaki, et al.
U.S. Appl. No. 16/431,954, filed Jun. 5, 2019, Ayumu Hashimoto, et al.
U.S. Appl. No. 16/533,984, filed Aug. 7, 2019, Masamoto Nakazawa, et al.
U.S. Appl. No. 16/575,457, filed Sep. 19, 2019, Tomohiro Sasa, et al.
U.S. Appl. No. 16/536,575, filed Aug. 9, 2019, Masamoto Nakazawa, et al.

* cited by examiner

INCLINATION DETECTING DEVICE, READING DEVICE, IMAGE PROCESSING APPARATUS, AND METHOD OF DETECTING INCLINATION

CROSS-REFERENCE TO RELATED APPLICATION

This patent application is based on and claims priority pursuant to 35 U.S.C. § 119(a) to Japanese Patent Application No. 2019-016466, filed on Jan. 31, 2019, in the Japan Patent Office, the entire disclosure of which is hereby incorporated by reference herein.

BACKGROUND

Technical Field

The present disclosure relates to an inclination detecting device, a reading device, an image processing apparatus, and a method of detecting inclination.

Discussion of the Background Art

Conventionally, there has been known an electric skew correction technique for correcting, on the basis of a skew angle and a registration position detected from a read image of an automatic document feeder (ADF), document skew and main/sub misregistration at the time of ADF reading through image processing.

SUMMARY

In an aspect of the present disclosure, there is provided an inclination detecting device that includes processing circuitry. The processing circuitry is configured to detect, in image information that is an image of an object imaged by an imaging device at an imaging position where a background member forms a background, a first boundary between the background member and a shadow of the object at a plurality of detection positions in at least one of a main-scanning direction and a sub-scanning direction on an outline of the object; detect a second boundary between the object and the shadow of the object at a plurality of detection positions in at least one of the main-scanning direction and the sub-scanning direction on the outline of the object in the image information; detect a boundary group including detection results of the second boundary at the plurality of detection positions; and detect an inclination of the object in the image information from detection results of the first boundary, the second boundary, and the boundary group.

In another aspect of the present disclosure, there is provided a reading device that includes an imaging device and processing circuitry. The imaging device is configured to image an object at an imaging position where a background member forms a background. The processing circuitry is configured to detect, in image information that is an image of the object imaged by the imaging device, a first boundary between the background member and a shadow of the object at a plurality of detection positions in at least one of a main-scanning direction and a sub-scanning direction on an outline of the object; detect a second boundary between the object and the shadow of the object at a plurality of detection positions in at least one of the main-scanning direction and the sub-scanning direction on the outline of the object in the image information; detect a boundary group including detection results of the second boundary at the plurality of detection positions; and detect an inclination of the object in the image information from detection results of the first boundary, the second boundary, and the boundary group.

In still another aspect of the present disclosure, there is provided an image processing apparatus that includes the reading device and an image forming device configured to form an image on basis of the image information read by the reading device.

In still yet another aspect of the present disclosure, there is provided a method of detecting an inclination. The method includes first detecting, in image information that is an image of an object imaged by an imaging device at an imaging position where a background member forms a background, a first boundary between the background member and a shadow of the object at a plurality of detection positions in at least one of a main-scanning direction and a sub-scanning direction on an outline of the object; second detecting a second boundary between the object and the shadow of the object at a plurality of detection positions in at least one of the main-scanning direction and the sub-scanning direction on the outline of the object in the image information; third detecting a boundary group including detection results of the second boundary at the plurality of detection positions; and detecting an inclination of the object in the image information from detection results obtained in the first detecting, the second detecting, and the third detecting.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
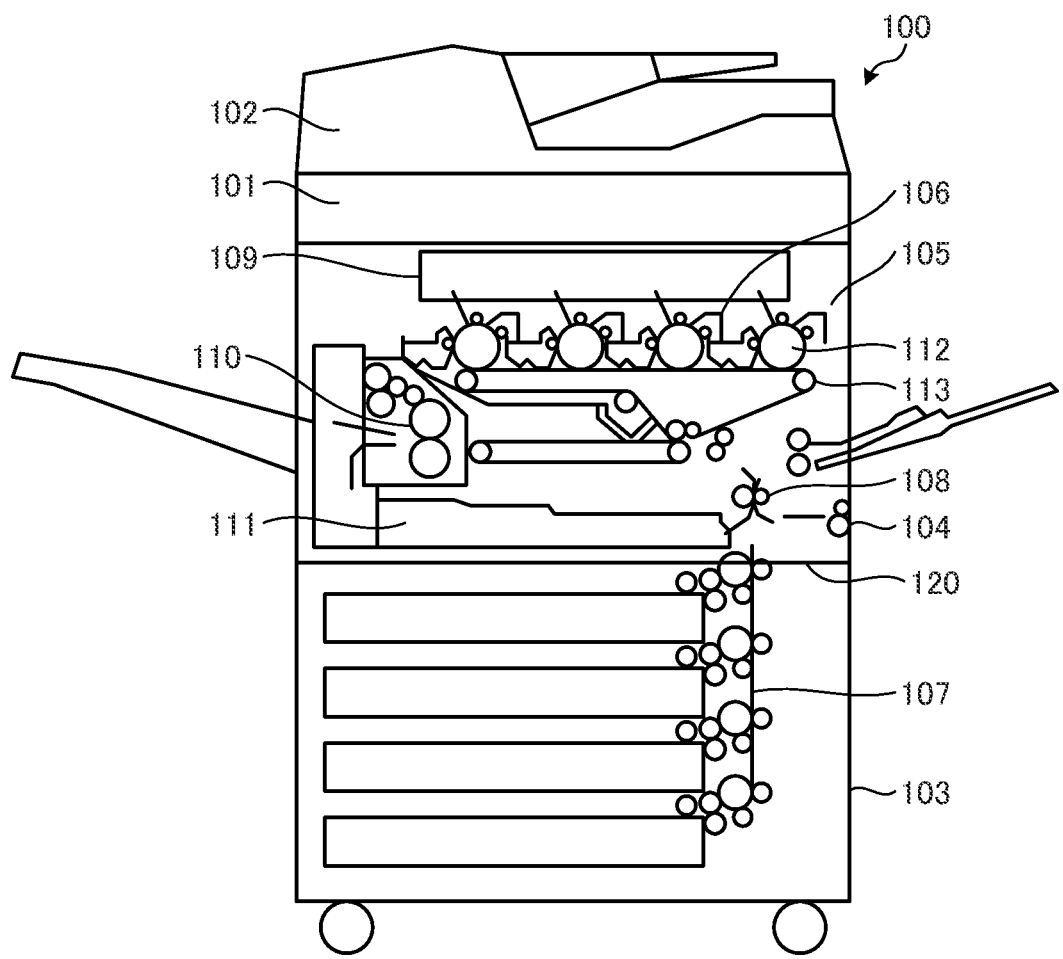
FIG. 1 is a cross-sectional view schematically illustrating a general configuration of an image processing apparatus according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of an inclination detecting device, a reading device, an image processing apparatus, and a method of detecting inclination will be described in detail with reference to the accompanying drawings.

First Embodiment

FIG. 1 is a cross-sectional view schematically illustrating a general configuration of an image processing apparatus 100 according to a first embodiment. The image processing apparatus 100 is a multifunction peripheral having at least two functions among a copy function, a printer function, a scanner function, and a facsimile function.

As illustrated in FIG. 1, the image processing apparatus 100 includes a sheet feeding device 103, an apparatus body 104, a scanner 101, and an automatic document feeder (ADF) 102.

The image processing apparatus 100 includes a plotter 120, which is an image forming device, inside the apparatus body 104. The plotter 120 includes an imaging device 105 of a tandem system, a registration roller 108 that supplies a recording sheet from the sheet feeding device 103 to the imaging device 105 via a conveyance path 107, an optical writing device 109, a fixing device 110, and a double-sided tray 111.

The imaging device 105 includes four photoconductor drums 112 corresponding to four colors of yellow (Y), magenta (M), cyan (C), and key plate (black) (K), which are arranged in parallel. Around each of the photoconductor drums 112, image formation elements including a charging device, a developing device 106, a transfer device, a cleaner, and a neutralizing device are disposed.

An intermediate transfer belt 113 stretched between a driving roller and a driven roller is disposed between the transfer device and the photoconductor drum 112 while being sandwiched between the nip of the two.

The image processing apparatus 100 of the tandem system having such a configuration performs, using the optical writing device 109, optical writing on the photoconductor drums 112 corresponding to the respective colors of Y, M, C, and K for each color on the basis of the document image obtained by reading the document as a detection target sent from the ADF 102 with the scanner 101, performs developing for each color toner using the developing device 106, and performs primary transfer on the intermediate transfer belt 113 in the order of Y, M, C, and K, for example. Then, the image processing apparatus 100 secondarily transfers the full-color image in which the four colors are superimposed based on the primary transfer onto a recording sheet supplied from the sheet feeding device 103, and then performs fixing using the fixing device 110 and performs sheet ejection, thereby forming a full-color image on the recording sheet.

Next, the scanner 101 will be described.

Figure 2:
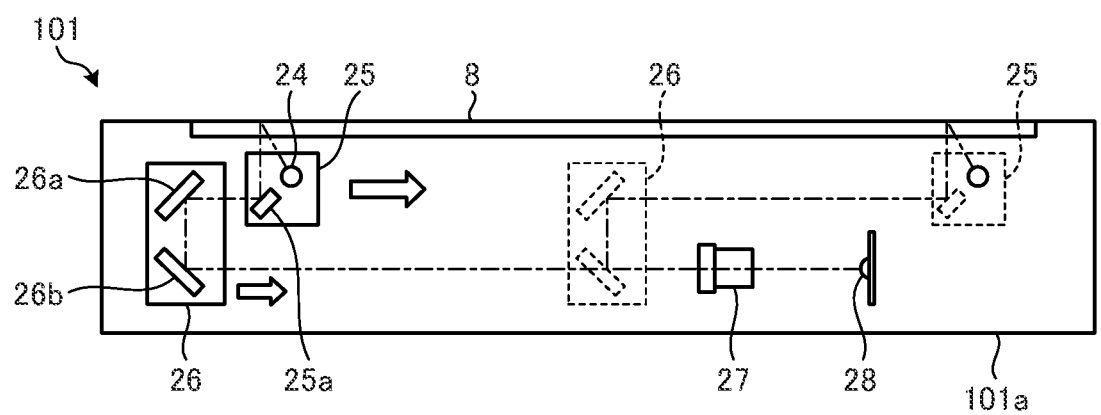
FIG. 2 is a cross-sectional view schematically illustrating a general configuration of a scanner.

FIG. 2 is a cross-sectional view schematically illustrating a general configuration of the scanner 101. As illustrated in FIG. 2, the scanner 101 includes a first carriage 25, a second carriage 26, an imaging lens 27, and an imaging device 28, and each of those components is disposed inside a body frame 101a of the scanner 101.

Furthermore, inside the body frame 101a of the scanner 101, a first rail and a second rail (not illustrated) are provided to extend in the sub-scanning direction (horizontal direction in FIG. 2). The first rail includes two rails disposed at a predetermined interval in the main-scanning direction orthogonal to the sub-scanning direction. The second rail also has a configuration similar to the configuration of the first rail.

The first carriage 25 is attached to the first rail in a slidable manner, and can be reciprocated between, in the sub-scanning direction, the position indicated by a solid line and the position indicated by a broken line in FIG. 2 via a first carriage drive wire (not illustrated) by a drive motor (not illustrated). The first carriage 25 includes a light source 24, and a first mirror member 25a.

The second carriage 26 is attached to the second rail in a slidable manner, and can be reciprocated between, in the sub-scanning direction, the position indicated by the solid line and the position indicated by the broken line in FIG. 2 via a second carriage drive wire (not illustrated) by a drive motor (not illustrated). The second carriage 26 includes a second mirror member 26a, and a third mirror member 26b.

Here, the first carriage 25 and the second carriage 26 move in the sub-scanning direction at a speed ratio of 2:1. Due to such a moving speed relationship, even if the first carriage 25 and the second carriage 26 move, the optical path length of light from the document surface to the imaging lens 27 does not change.

The imaging lens 27 condenses and images reflected light from the document entered through each mirror member on the imaging device 28. The imaging device 28 includes an imaging element such as a charge-coupled device (CCD), which photoelectrically converts the reflected light image of the document formed through the imaging lens 27, and outputs an analog image signal that is a read image.

Next, the ADF 102 to be mounted on the scanner 101 will be described.

Figure 3:
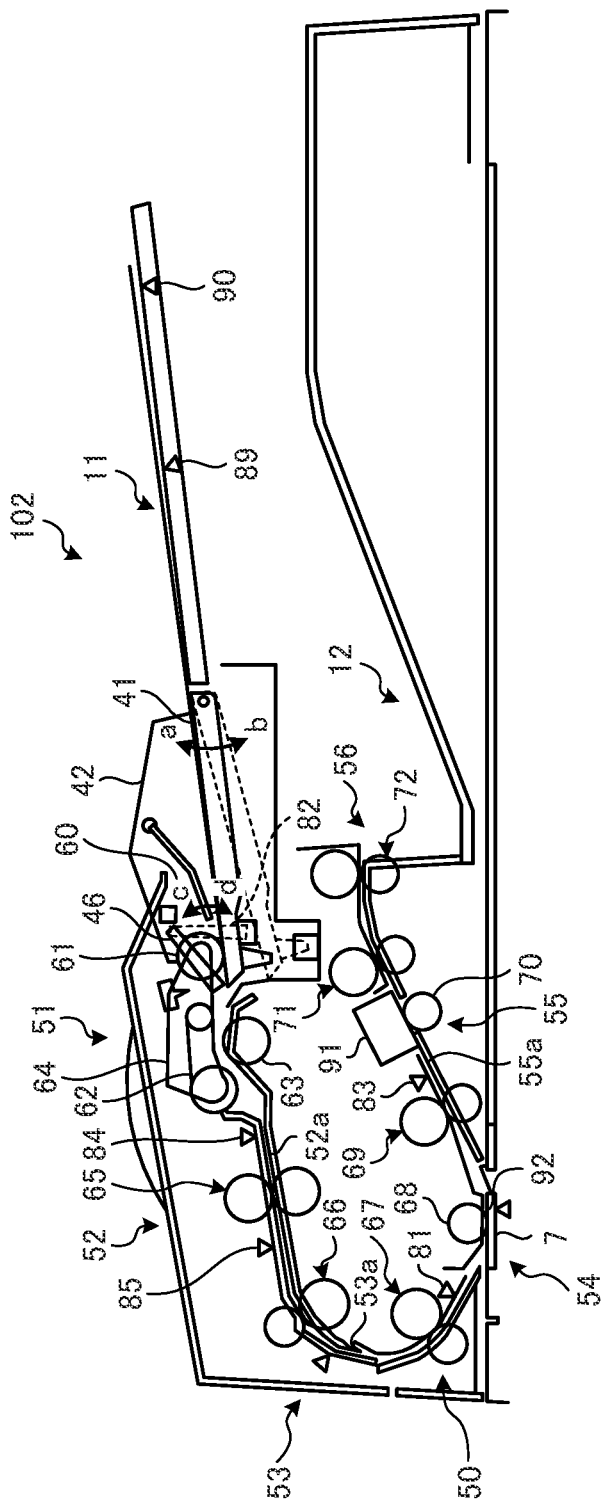
FIG. 3 is a cross-sectional view schematically illustrating a general configuration of an ADF.

FIG. 3 is a cross-sectional view schematically illustrating a general configuration of the ADF 102. As illustrated in FIG. 3, the ADF 102 includes a document tray 11 on which documents are to be placed. The document tray 11 includes a movable document table 41 that rotates in "a" and "b" directions in the drawing with a base end serving as a fulcrum, and a pair of side guide plates 42 that position in the horizontal direction with respect to the sheet feeding direction of the document. With the movable document table 41 rotating, the front end of the document in the feeding direction is adjusted to an appropriate height.

Further, the document tray 11 is provided with document length detection sensors 89 and 90 that detect whether the orientation of the document is portrait or landscape, which are separated in the feeding direction. Note that, as the document length detection sensors 89 and 90, a reflection type sensor that performs detection with an optical means without contact or a contact type actuator sensor may be used.

One side of the pair of side guide plates 42 is slidable in the horizontal direction with respect to the sheet feeding direction, and is configured in such a manner that documents of different sizes can be placed on the plates.

The fixed side of the pair of side guide plates 42 is provided with a set feeler 46 that is rotated by a document being placed. The set feeler 46 is provided with, at the lowermost part on the movement trajectory of the tip of the feeler, a document set sensor 82 that detects placement of the document on the document tray 11. That is, the document set sensor 82 detects whether there is a document set on the ADF 102 on the basis of whether or not the set feeler 46 has rotated to be removed from the document set sensor 82.

The ADF 102 includes a conveyer 50, which includes a separation feeder 51, a pull-out unit 52, a turn unit 53, a first reading conveyer 54, a second reading conveyer 55, and a sheet ejector 56. Each conveyance roller of the conveyer 50 is rotationally driven by one or more conveyance motors.

The separation feeder 51 includes a pickup roller 61 disposed in the vicinity of a sheet feeding port 60 for feeding a document, and a sheet feeding belt 62 and a reverse roller 63 disposed to face each other across a conveyance path.

The pickup roller 61 is supported by a supporting arm member 64 attached to the sheet feeding belt 62, and moves up and down in "c" and "d" directions in the drawing between, via a cam mechanism (not illustrated), a contact position for contacting a document bundle and a separated position away from the document bundle. The pickup roller 61 picks up several (ideally one) documents out of the documents stacked on the document tray 11 at the contact position.

The sheet feeding belt 62 rotates in the sheet feeding direction, and the reverse roller 63 rotates in the direction opposite to the sheet feeding direction. While the reverse roller 63 rotates in the reverse direction with respect to the sheet feeding belt 62 when the documents have been subject to multiple feeding, if the reverse roller 63 is in contact with the sheet feeding belt 62 or only one sheet of the document is being conveyed, it rotates together with the sheet feeding belt 62 due to the action of a torque limiter (not illustrated). As a result, multiple feeding of the documents is suppressed.

The pull-out unit 52 includes pull-out rollers 65, which include a pair of rollers disposed to sandwich a conveyance path 52a. The pull-out unit 52 performs primary abutting alignment (what is called skew correction) on the sent document according to the drive timing of the pull-out rollers 65 and the pickup roller 61, and pulls out and conveys the document after the alignment.

The turn unit 53 includes intermediate rollers 66 and reading entrance rollers 67, which include a pair of rollers disposed to sandwich a conveyance path 53a curved from the top to the bottom. The turn unit 53 turns the document drawn and conveyed by the intermediate rollers 66 by conveying it on the curved conveyance path, and conveys the document to, using the reading entrance rollers 67, the vicinity of slit glass 7 that is a document reading position (imaging position) with the front face of the document facing downward.

Here, the conveyance speed of the document from the pull-out unit 52 to the turn unit 53 is set to be higher than the conveyance speed of the first reading conveyer 54. Accordingly, the conveyance time of the document conveyed to the first reading conveyer 54 is shortened.

The first reading conveyer 54 includes a first reading roller 68 disposed to face the slit glass 7, and first reading exit rollers 69 disposed on a conveyance path 55a after the reading is complete. The first reading conveyer 54 conveys, using the first reading roller 68, the document conveyed to the vicinity of the slit glass 7 with the front face of the document being brought into contact with the slit glass 7. At this time, the document is read by the scanner 101 through the slit glass 7. At this time, the first carriage 25 and the second carriage 26 of the scanner 101 are stopped at the home position. The first reading conveyer 54 further conveys the document after the reading is complete using the first reading exit rollers 69.

Figure 4:
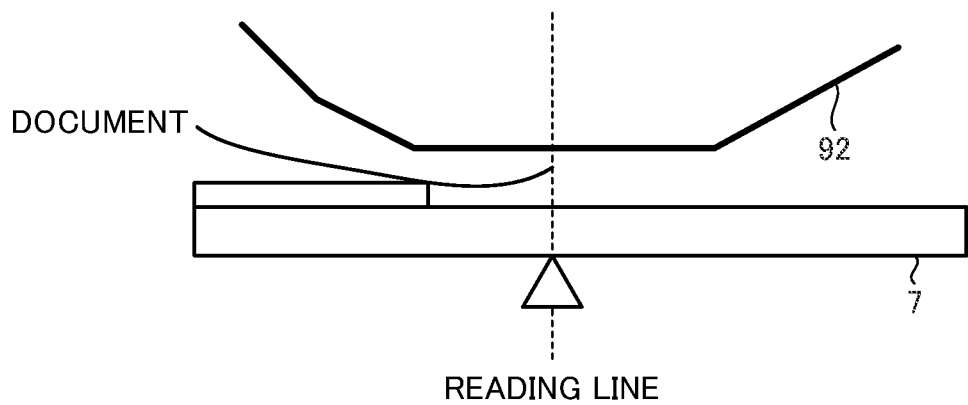
FIG. 4 is a diagram schematically illustrating a configuration in the vicinity of a document reading position.

Here, FIG. 4 is a diagram schematically illustrating a configuration in the vicinity of the document reading position. Note that the document is conveyed from left to right in FIG. 4.

As illustrated in FIG. 4, the ADF 102 includes a background member 92 to be an imaging background at a position facing the slit glass 7. The background member 92 is white, for example, and is used for shading correction. The document is conveyed between the slit glass 7 and the background member 92. The scanner 101 reads an image at the position of the reading line illustrated in FIG. 4.

The second reading conveyer 55 includes a second reader 91 that reads a back side of the document, a second reading roller 70 disposed to face the second reader 91 across the conveyance path 55a, and second reading exit rollers 71 disposed on the downstream side of the second reader 91.

The second reader 91 in the second reading conveyer 55 reads the back side of the document whose front face has been read. The document whose back side has been read is conveyed toward a sheet ejection port by the second reading exit rollers 71. The second reading roller 70 suppresses floating of the document in the second reader 91, and also serves as a white reference part for obtaining shading data in the second reader 91. In the case of not performing duplex reading, the document passes through the second reader 91.

The sheet ejector 56 includes an ejection roller pair 72 in the vicinity of the sheet ejection port, and ejects the document conveyed by the second reading exit rollers 71 onto an ejection tray 12.

Furthermore, the ADF 102 includes various sensors such as an abutment sensor 84, a registration sensor 81, and a sheet ejection sensor 83 along the conveyance path, which are used for conveyance control such as a conveyance distance and a conveyance speed of the document.

A document width sensor 85 is further provided between the pull-out rollers 65 and the intermediate rollers 66. Note that the length of the document in the conveyance direction is detected from the motor pulse by reading of the front end and the rear end of the document with the abutment sensor 84 and the registration sensor 81.

Next, a hardware configuration of the image processing apparatus 100 will be described.

Figure 5:
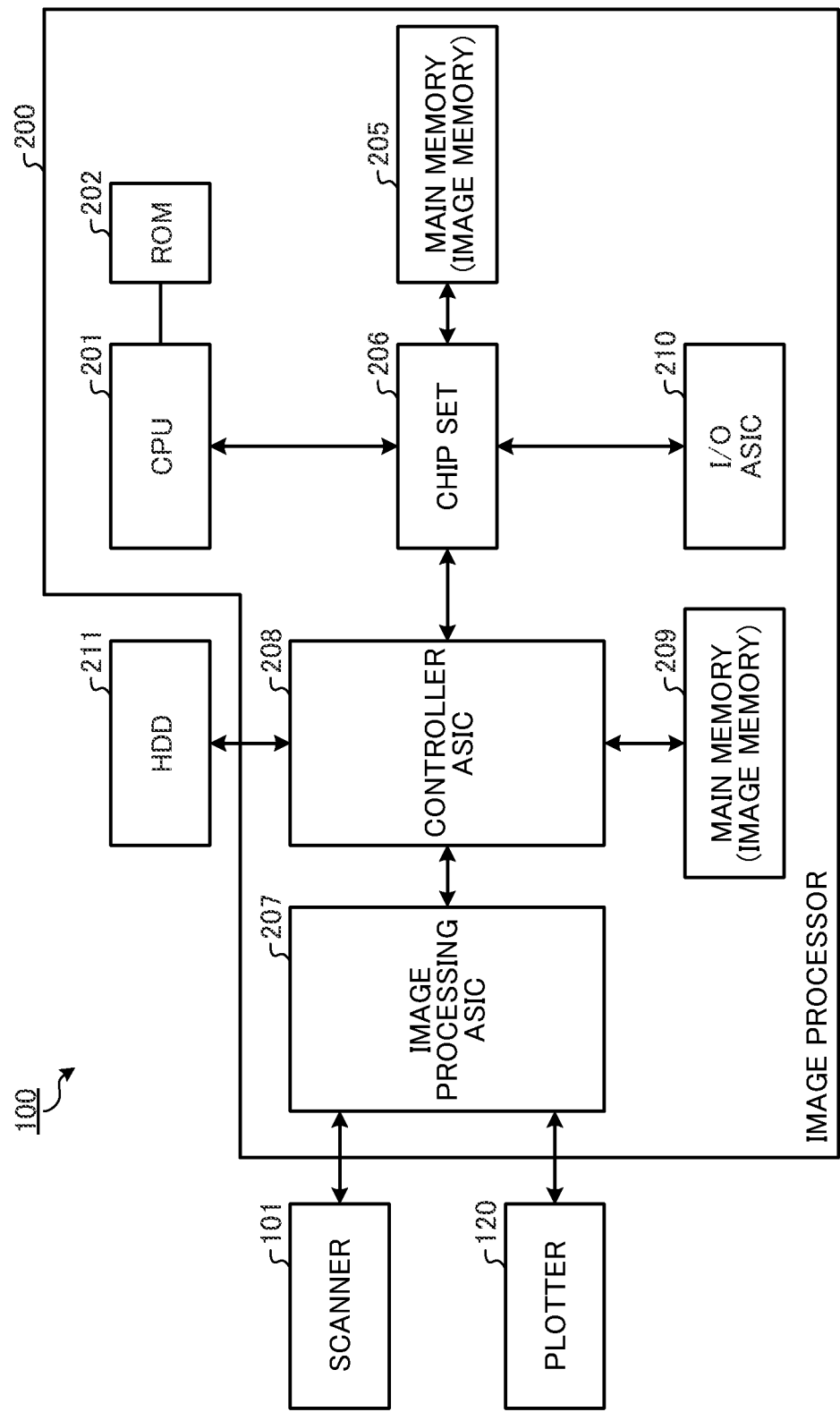
FIG. 5 is a block diagram illustrating a hardware configuration of the image processing apparatus.

Here, FIG. 5 is a block diagram illustrating the hardware configuration of the image processing apparatus 100. As illustrated in FIG. 5, the image processing apparatus 100 includes an image processor 200 that performs a predetermined process on the document image read by the scanner 101 and outputs it to the plotter 120 as image data. The scanner 101, the ADF 102, and the image processor 200 are included in an inclination detecting device and a reading device.

The image processor 200 includes a central processing unit (CPU) 201, a read only memory (ROM) 202, a main memory 205, a chip set 206, an image processing ASIC 207, a controller ASIC 208, a main memory 209, and an input/output (I/O) ASIC 210. Note that ASIC is an abbreviation of an application-specific integrated circuit.

The CPU 201 is for controlling the image processing apparatus 100. The main memory 205 is used as a work area in which a program for the CPU 201 to control the image processing apparatus 100 is loaded, or temporarily stores image data to be handled (image memory). The chip set 206 is used together with the CPU 201 to control the controller ASIC 208 and the I/O ASIC 210 accessing the main memory 205.

The program to be executed by the image processing apparatus 100 according to the present embodiment may be provided in such a state of being recorded in a computer readable recording medium, such as a compact disc read only memory (CD-ROM), a flexible disk (FD), a compact disc-recordable (CD-R), and a digital versatile disk (DVD), as a file in an installable format or an executable format.

Further, the program to be executed by the image processing apparatus 100 according to the present embodiment may be provided in such a state of being stored in a computer connected to a network, such as the Internet, and being downloaded via the network. Furthermore, the program to be executed by the image processing apparatus 100 according to the present embodiment may be provided or distributed via a network, such as the Internet.

The scanner 101 has a function of reading image data to be copied and image data to be output to an external interface. The plotter 120 has a function for printing image data having been subject to image processing performed by the controller ASIC 208.

The image processing ASIC 207 performs image processing on the image data read by the scanner 101, and outputs image data to the controller ASIC 208. Further, the image processing ASIC 207 performs image processing so that the image data from the controller ASIC 208 can be printed by the plotter 120, and transmits image data according to the printing timing of the plotter 120.

The controller ASIC 208 uses the main memory 205 over the chip set 206 to rotate and edit the image data handled by the image processing apparatus 100, accumulates the image data in an HDD 211, and exchanges the image data with the image processing ASIC 207. The main memory 209 is used as an image memory for the controller ASIC 208 to perform image processing. The hard disk drive (HDD) 211 is used to temporarily store image data having been subject to image processing.

The I/O ASIC 210 is an external interface for giving an additional function to the image processing apparatus 100. For example, the I/O ASIC 210 includes an interface, such as a network interface, a universal serial bus (USB), a secure digital (SD) card, an operation device, a serial peripheral interface (SPI), an inter-integrated circuit (I2C), and the document width sensor 85, a hardware accelerator for speeding up image processing, an encryption processing circuit, and the like.

Next, functions to be exerted by the image processor 200 will be described.

Figure 6:
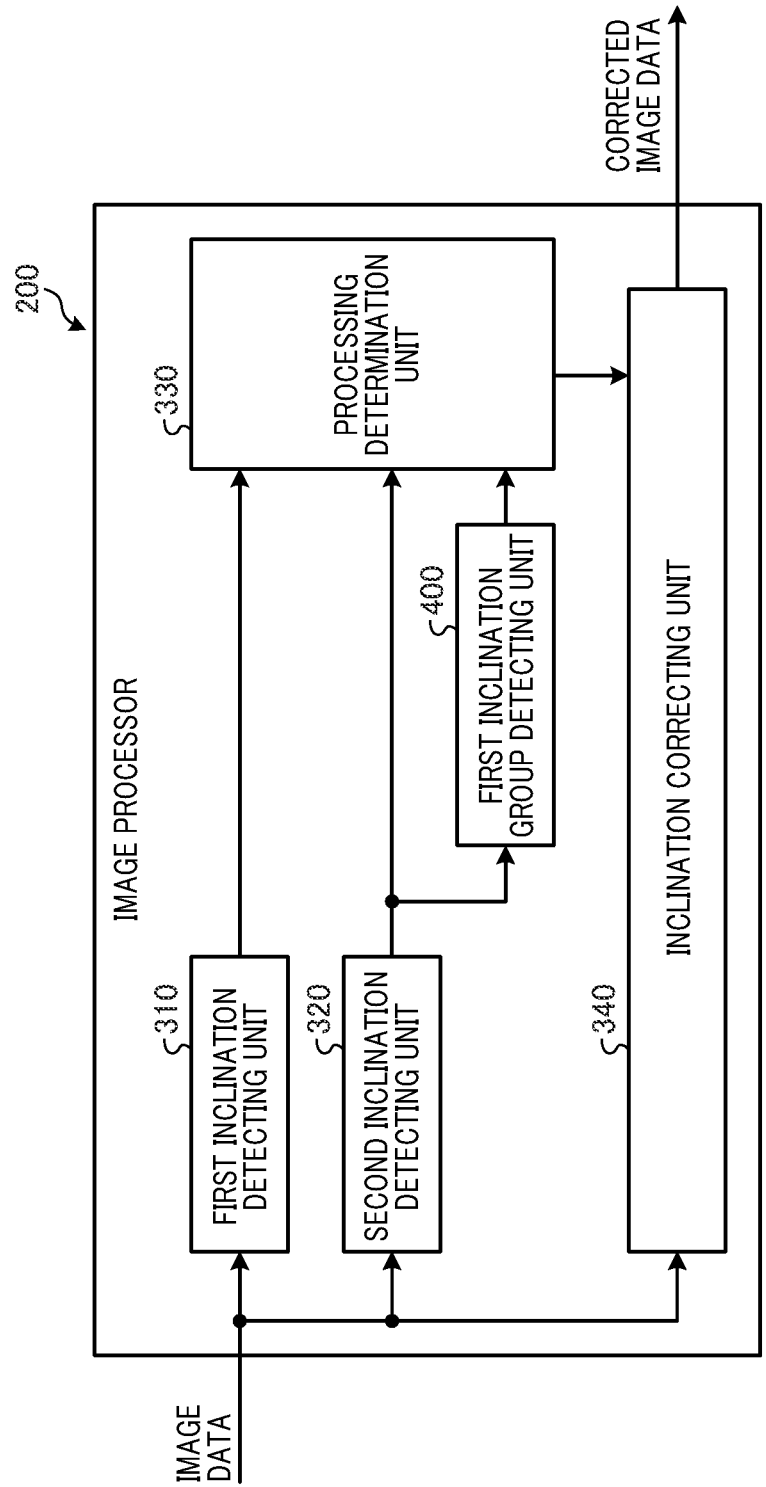
FIG. 6 is a block diagram illustrating functions of an image processor.

Here, FIG. 6 is a block diagram illustrating the functions of the image processor 200. Note that characteristic functions in the present embodiment will be described here among the functions to be exerted by the image processor 200.

As illustrated in FIG. 6, the image processor 200 includes an image generating unit 300, a first inclination detecting unit 310 that functions as a first boundary detecting unit, a second inclination detecting unit 320 that functions as a second boundary detecting unit, a processing determination unit 330, an inclination correcting unit 340 that functions as an inclination detecting unit, and a first inclination group detecting unit 400 that functions as a boundary group detecting unit. In the present embodiment, the image processing ASIC 207 includes the image generating unit 300, and the controller ASIC 208 includes the first inclination detecting unit 310, the second inclination detecting unit 320, the processing determination unit 330, the inclination correcting unit 340, and the first inclination group detecting unit 400. Note that the present disclosure is not limited to the above, and the CPU 201 may execute a program to implement the first inclination detecting unit 310, the second inclination detecting unit 320, the processing determination unit 330, the inclination correcting unit 340, and the first inclination group detecting unit 400.

The image generating unit 300 generates digital image data (hereinafter referred to as image data) that is image information on the basis of analog image signals obtained by reading, with the imaging device 28, reflected light of the light emitted to the document passing through the slit glass 7 that is the document reading position (imaging position).

Figure 7:
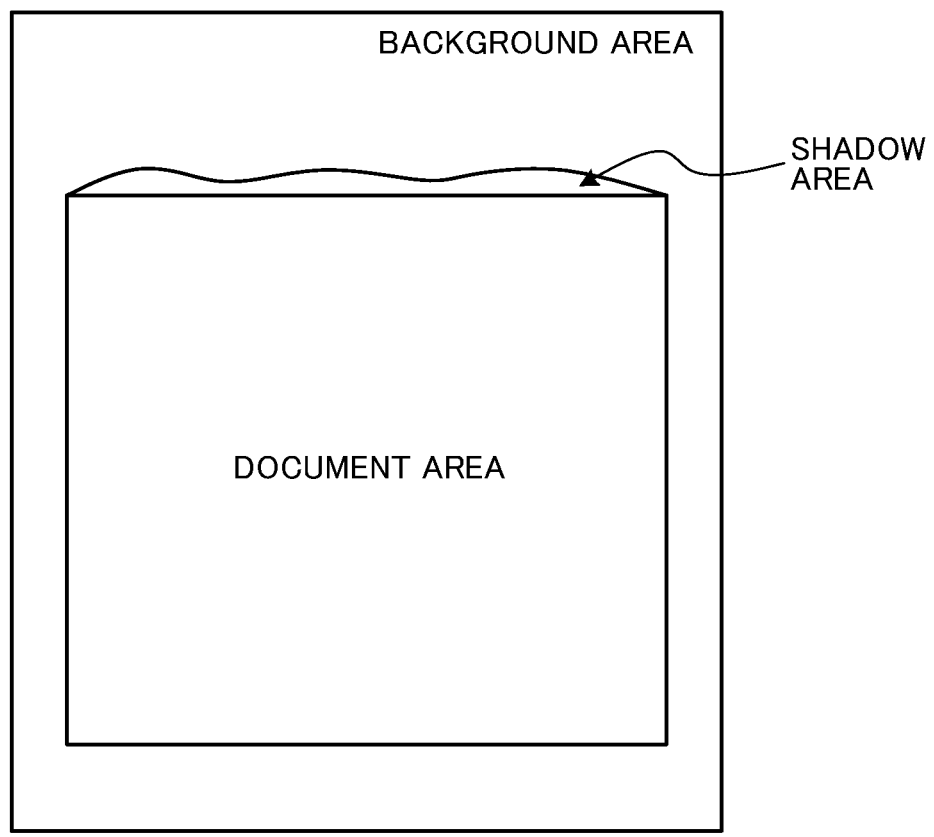
FIG. 7 is a diagram illustrating exemplary image data.

Here, FIG. 7 is a diagram illustrating exemplary image data.

As illustrated in FIG. 7, in the image data, a shadow area occurs at the boundary between the background area and the document area. In the case where the background member 92 is white, a shadow appears inevitably. Note that, although the shadow area is illustrated only on the upper side in FIG. 7, the shadow area occurs on the entire outline of the document.

If the distance between the document and the background member 92 is constant in the main-scanning direction, the width of the shadow area is uniform in the main-scanning direction. However, the width of the shadow area in the image data varies depending on the distance between the document and the background member 92. The shadow area in FIG. 7 illustrates an exemplary case where curl, a fold, or the like occurs at the edge of the document and variation occurs at the document edge so that the shadow width does not become uniform. For example, in a case where the document is on the upper side, that is, on the side of the background member 92, the width of the shadow area is narrower. On the other hand, in a case where the document is on the lower side, that is, on the side of the slit glass 7, the width of the shadow area is wider.

Figure 8A:
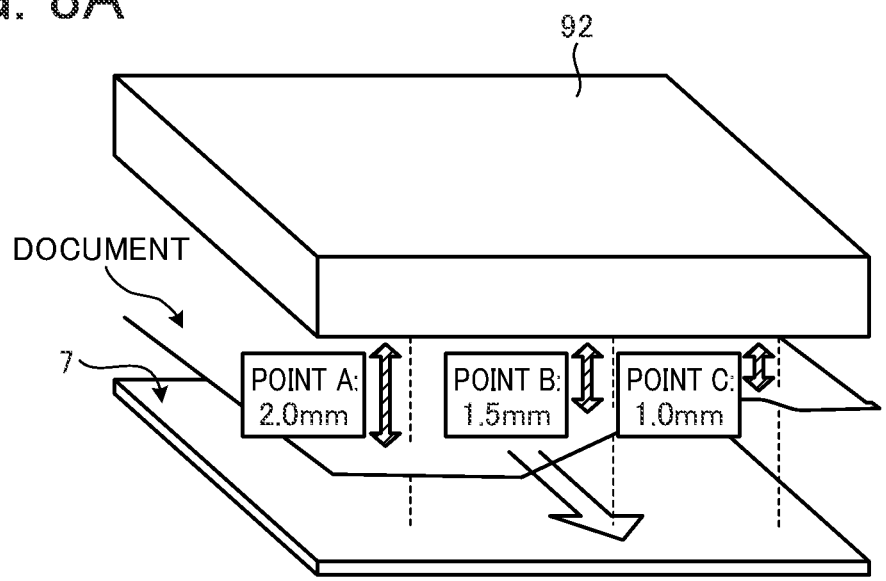
FIGS. 8A and 8B are diagrams exemplarily illustrating a width of a shadow area.
Figure 8B:
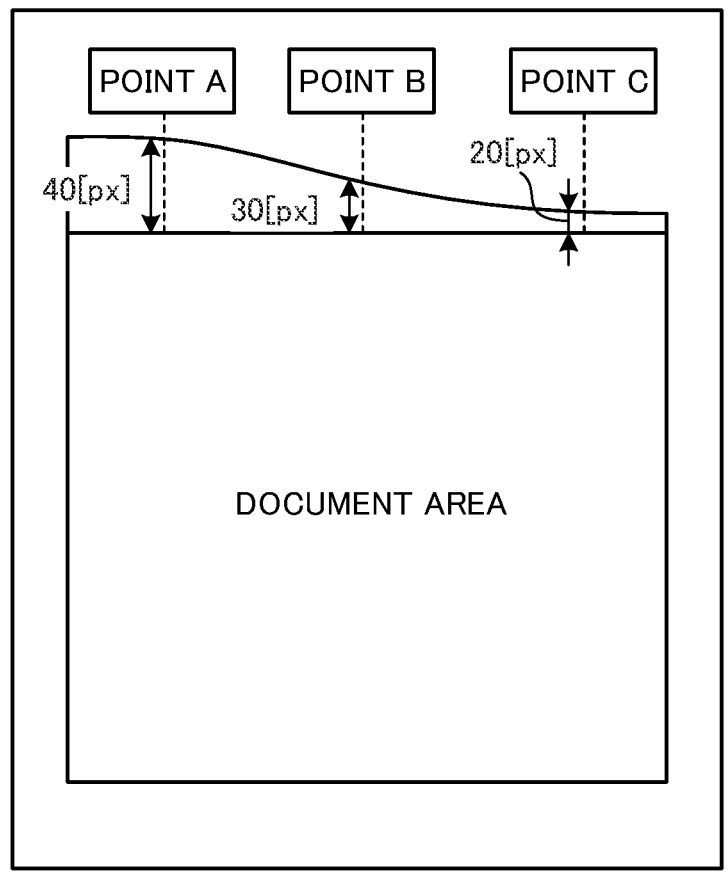

Here, FIGS. 8A and 8B are diagrams exemplarily illustrating the width of the shadow area. As illustrated in FIG. 8A, the document is curled from point A to point C, and the distance between the document and the background member 92 in the main-scanning direction is not constant. Accordingly, in the exemplary shadow area illustrated in FIG. 8B, the shadow width is not uniform from the point A to the point C.

The first inclination detecting unit 310 extracts, using a method of detecting a boundary illustrated in FIGS. 9A and 9B to be described later, boundary pixels within a range of a predetermined number of lines from a part or all of the outline in the main-scanning direction of the document in the image data including the background area, and detects the inclination amount (skew amount) of the document from the detection result of the boundary (shadow edge of the document) between the background area and the shadow area.

In the present embodiment, the first inclination detecting unit 310 detects the boundary between the background member 92 and the document shadow on the upper side, and detects the inclination amount of the document from a result of the detection of the boundary.

As described above, if the shadow width is uniform in the main-scanning direction, the inclination amount can be accurately detected from the detection result of the first inclination detecting unit 310. However, in a case where curl, a fold, or the like occurs at the edge of the document, the shadow width of the main scanning is not uniform, and an error based on the influence of the shadow width variation occurs in the inclination amount detection result of the first inclination detecting unit 310. That is, in the case of correction using only the inclination amount of the shadow area, erroneous correction occurs if the document is damaged.

In view of the above, the second inclination detecting unit 320 extracts, using the method of detecting a boundary illustrated in FIGS. 9A and 9B to be described later, boundary pixels within a range of a predetermined number of lines from a part or all of the outline in the main-scanning direction of the document in the image data including the background area, detects a boundary (document edge) between the shadow area and the document area, and detects the inclination amount of the document from the detection result of the boundary.

In the present embodiment, the second inclination detecting unit 320 detects the inclination amount of the document from the detection result of the boundary between the document shadow and the document on the upper side in the image data.

For example, stability of the outline in the main-scanning direction and the outline in the sub-scanning direction differs depending on the device configuration of the scanner 101. In a case where the stability of the outline in the main-scanning direction is high, accuracy in the detection can be improved by the inclination amount being detected only from the outline in the main-scanning direction.

Figure 9A:
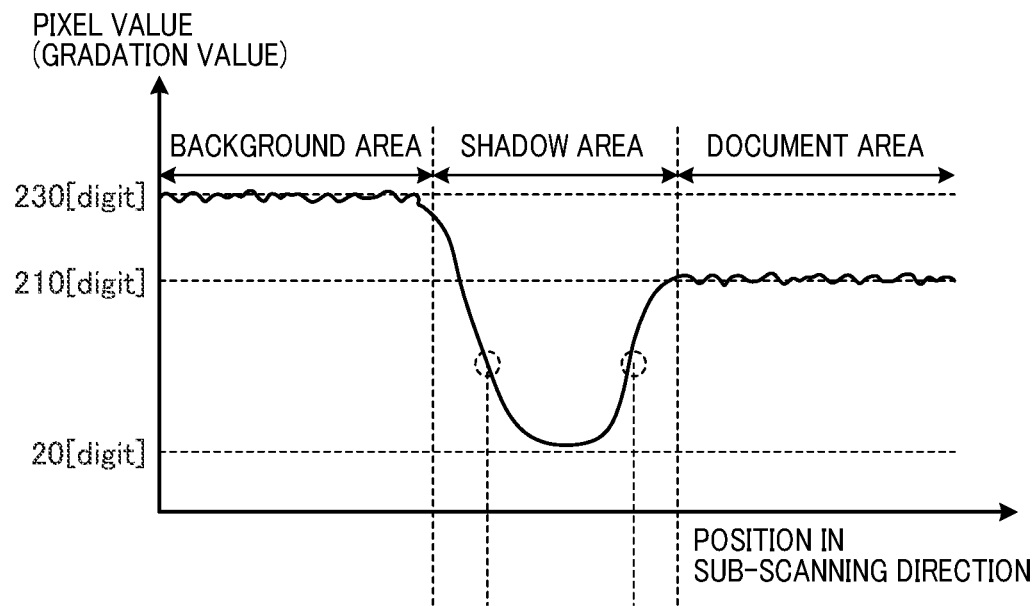
FIGS. 9A and 9B are graphs illustrating a method of detecting a boundary (shadow edge) between a background area and a shadow area and a boundary (document edge) between a shadow area and a document area.
Figure 9B:
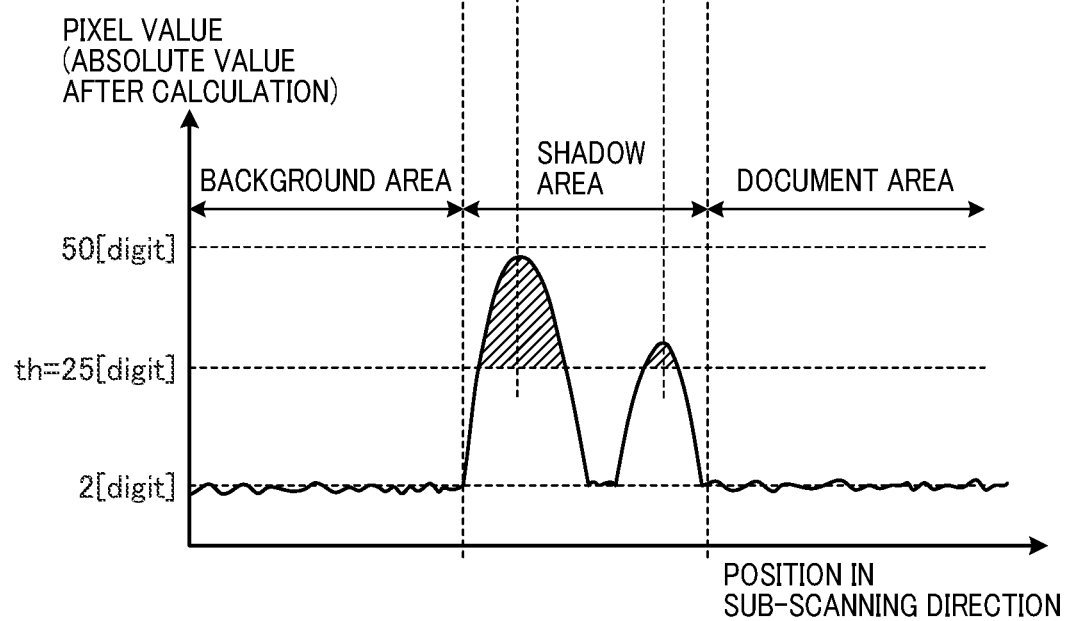

Here, FIGS. 9A and 9B are graphs illustrating a method of detecting a boundary (shadow edge) between the background area and the shadow area and a boundary (document edge) between the shadow area and the document area. FIG. 9A illustrates a change in gradation in the sub-scanning direction in the image data illustrated in FIG. 7, which is an exemplary case where the background member 92 is white and the background color of the document is a light color.

A pixel value (gradation value) is luminance or brightness, which is large for a bright pixel and is small for a dark pixel. The pixel value decreases from 230 digits to 20 digits when moving from the background area including a white color to the shadow area. Subsequently, when moving from the shadow area to the document area, the pixel value increases to 210 digits.

FIG. 9B is a graph illustrating the amount of change in the pixel value obtained in FIG. 9A. In the graph illustrated in FIG. 9B, the amount of change is calculated by differential operation, and the calculated pixel values are plotted with respect to the position in the sub-scanning direction. Note that, although the amount of change has a sign, an absolute value is used here for simplicity.

Since the calculated pixel value increases as the amount of change between pixels increases, peaks are detected at the boundary (shadow edge) between the background area and the shadow area and at the boundary (document edge) between the shadow area and the document area. Note that a boundary pixel is determined by comparison with a predetermined threshold value to remove a noise component. For example, in a case where a threshold value th is 25 digits, the position in the sub-scanning direction indicated by the hatched area on the graph illustrated in FIG. 9B is the boundary pixel.

Note that the method of detecting a boundary is not limited to the content described in the present embodiment. For example, image processing such as a Hough transform may be used instead of differential operation.

Figure 10A:
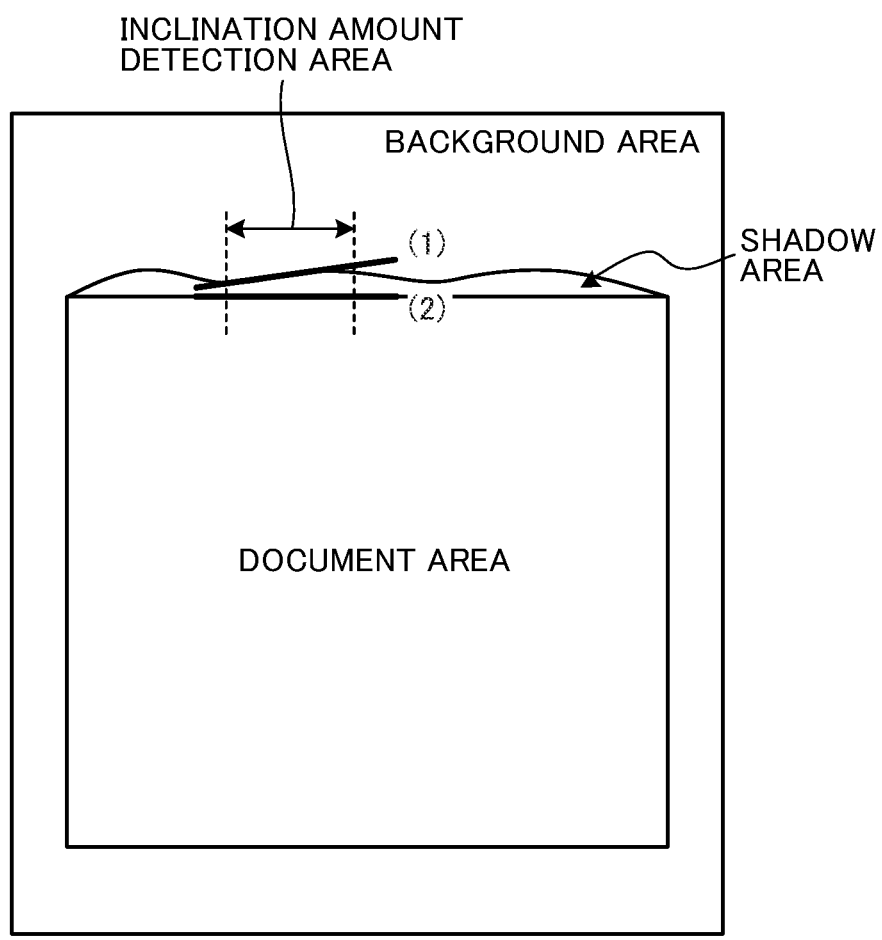
FIGS. 10A and 10B are diagrams illustrating exemplary inclination amount detection from image data.
Figure 10B:
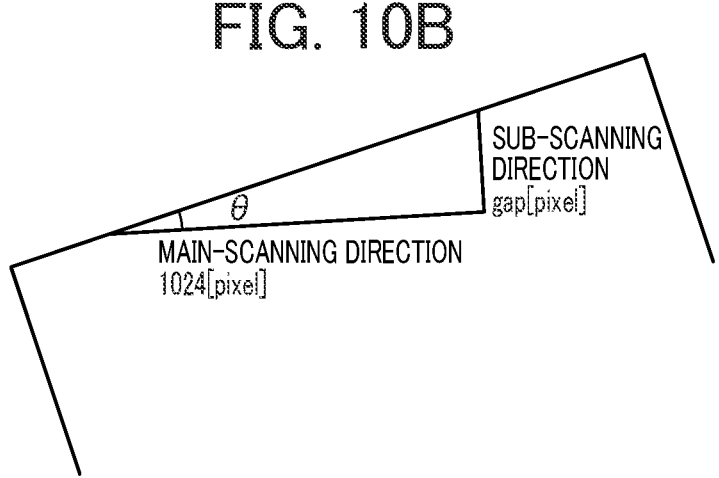

Here, Here, FIGS. 10A and 10B are diagrams illustrating exemplary inclination amount detection from the image data. FIGS. 10A and 10B illustrate an inclination amount detection result (1) of the first inclination detecting unit 310 calculated from the detection result of the boundary between the background area and the shadow area in the case where the width of the shadow area varies, and an inclination amount detection result (2) of the second inclination detecting unit 320 calculated from the detection result of the boundary between the shadow area and the document area. Those are calculated as inclination amounts on the basis of the absolute coordinates obtained by extracting the boundary pixels using the method of detecting a boundary illustrated in FIGS. 9A and 9B.

FIG. 10A illustrates image data in which the boundary (shadow edge) between the background area and the shadow area varies. The example illustrated in FIG. 10A is an exemplary case where the document has a fold and curl, and the distance between the document and the background member 92 is not uniform in the main-scanning direction. Accordingly, the inclination amount detection result (1) of the first inclination detecting unit 310 shows that the distance between the document and the background member 92 varies in the main-scanning direction of the document, whereby the shadow is not uniform in the main-scanning direction of the document and variation in the shadow width occurs.

Here, as illustrated in FIG. 10B, the inclination angle is handled as an inclination amount gap (gap∈natural number, 0<gap≤1,024) in the sub-scanning direction with respect to the document main-scanning direction 1,024 pixels. Although the inclination angle will be described in gap in the following descriptions, a method of managing values is not limited thereto.

In general, as a method of calculating an inclination amount from a boundary pixel, there has been a method in which absolute coordinates of the boundary pixel are simply obtained from a part or all of the document, an approximation straight line is obtained from each coordinate using the least-square method or the like, and its inclination is determined as an inclination amount. However, according to the method, there is a disadvantage that an error from the actual document inclination amount becomes large in the case where the shadow edge varies.

One of the reasons why the shadow edge is unstable is because the shadow edge expands and contracts by a product of the distance between the document and the background member 92 and a coefficient (light source intensity, light source angle, etc.) determined from the configuration of the scanner 101 so that minute folding or curling of the edge of the document may largely affects the shadow edge.

However, even in such a case, the inclination amount detection result (2) of the second inclination detecting unit 320 calculated from the boundary (document edge) between the shadow area and the document area includes an error but those effects are small, and shows an inclination amount close to the outline of the document.

Therefore, for example, by calculating the variation of the inclination amount detection result (1) on the basis of the inclination amount detection result (2), and detecting, from a result of the calculation, whether there is variation such as curl, a fold, or the like at the document edge, it becomes possible to provide a function of correcting an inclination amount that does not perform erroneous correction. An exemplary arithmetic expression takes an absolute value of the inclination amount (1) and the inclination amount (2), for example.

Figure 11:
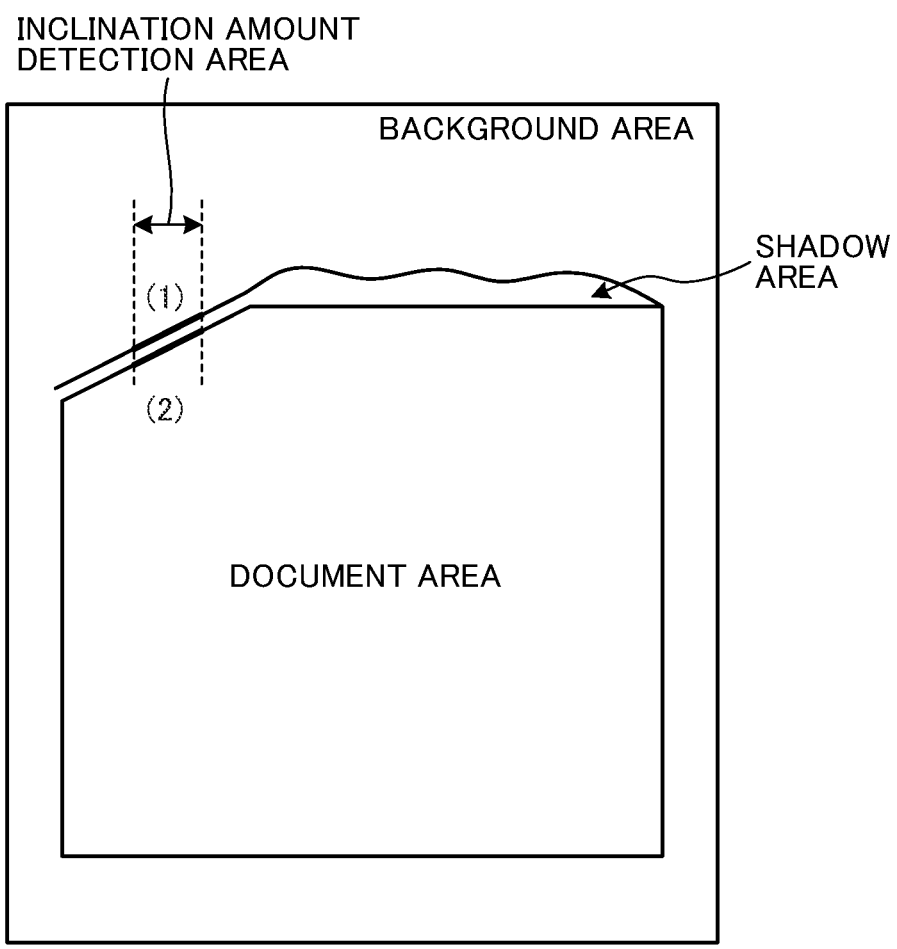
FIG. 11 is a diagram illustrating a case where variation of the document edge is large.

Here, FIG. 11 is a diagram illustrating a case where variation of the document edge is large. FIG. 11 illustrates image data in which the boundary (shadow edge) between the background area and the shadow area and the boundary (document edge) between the shadow area and the document area vary, and the document edge is partially missing.

As described with reference to FIGS. 10A and 10B, it has been described that the document outline is used as a reference for detecting the variation amount of the shadow on the assumption that the variation of the document outline is small even if the document has a fold, curl, or the like. However, as illustrated in FIG. 11, in a case where there is a physical chipping or largely varied area in the inclination amount detection area (boundary detection area), reliability of the document edge is not ensured and the document edge does not serve as a reference.

For example, in the image data illustrated in FIG. 11, the difference between the inclination amount detection result (1) and the inclination amount detection result (2) to be a reference is small so that the document edge is determined not to have a fold or curl, but such determination is wrong. The inclination amount detected in the inclination amount detection area takes a value largely deviating from the actual document inclination amount.

Figure 12A:
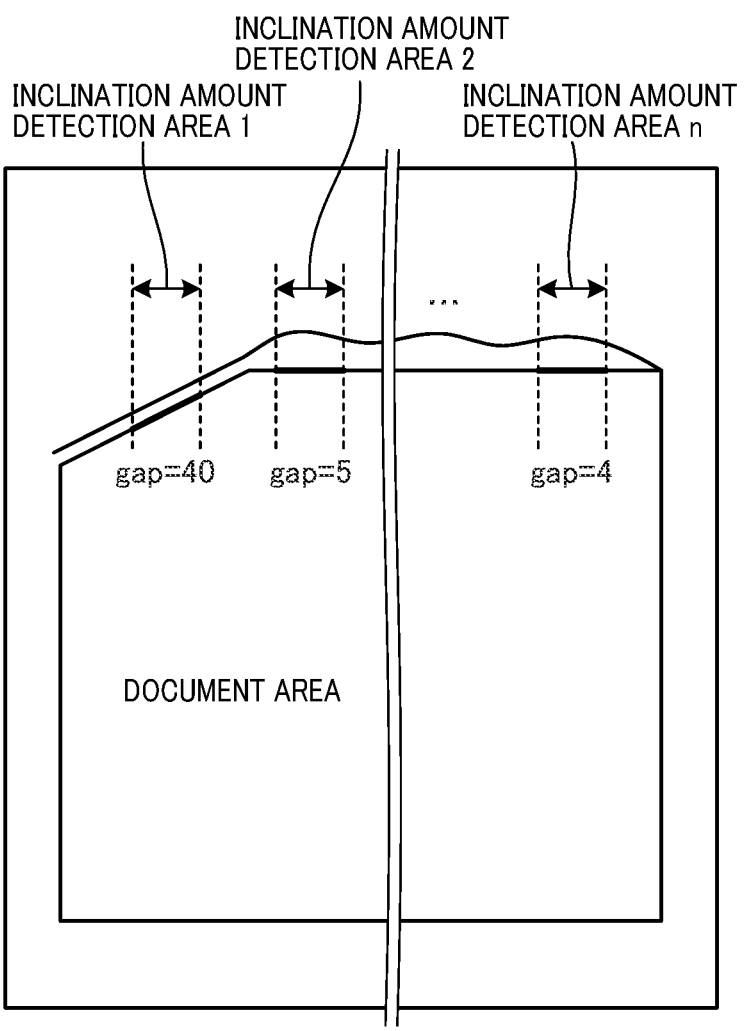
FIGS. 12A and 12B are diagrams illustrating processing in an inclination group detecting unit.
Figure 12B:
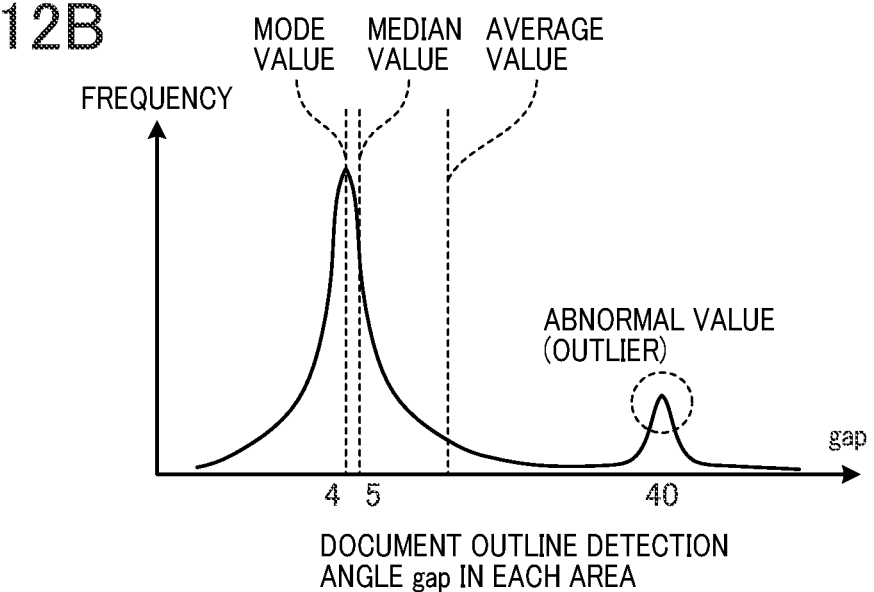

In view of the above, the output of the second inclination detecting unit 320 is further input to the first inclination group detecting unit 400. Hereinafter, processing to be performed in the first inclination group detecting unit 400 will be described in detail. FIGS. 12A and 12B are diagrams illustrating the processing in the first inclination group detecting unit 400.

In view of the disadvantage described with reference to FIG. 11, the first inclination group detecting unit 400 first determines an inclination amount detection area in which the document outline variation is small. Subsequently, the processing determination unit 330 calculates the variation of the inclination amount detection result (2) in the case where the inclination amount detection result (1) is used as a reference with respect to the determined inclination amount detection area, and determines processing by detecting whether there is variation such as curl, a fold, or the like at the document edge.

Accordingly, it becomes possible to generate an appropriate reference even in the case where there is a physical chipping or largely varied area at the document edge. Accuracy in skew and registration correction can be improved as compared with the background art, and erroneous detection can be suppressed even in the case of a high-density document in which the document edge may not be detected.

More particularly, as illustrated in FIG. 12A, the first inclination group detecting unit 400 sets a plurality of inclination amount detection areas with a predetermined width and a predetermined interval with respect to the main-scanning direction of the image data, detects a boundary (boundary group) from the document outline for each inclination amount detection area, and obtains an inclination amount of the document from the detection result of the boundary (boundary group).

The first inclination group detecting unit 400 sets the inclination amount of each inclination amount detection area obtained from FIG. 12A as an inclination amount group. FIG. 12B is a graph illustrating each inclination amount in the inclination amount group as frequency distribution (histogram).

As a method of determining the inclination amount detection area, the first inclination group detecting unit 400 obtains the mode value from the frequency distribution of the inclination amount group, and determines the area where the mode value is obtained as an inclination amount detection area. Accuracy can be expected as the mode value is a statistic not affected by an abnormal value (outlier).

As illustrated in FIG. 12B, even in the case where the document has a fold or curl, the influence exerted on the document edge is small, whereby normal distribution having a peak near gap=4 is confirmed. However, as illustrated in FIG. 12B, there is a part with a large damage such as a part where a part of the document edge is chipped as represented by the inclination amount detection area 1 (see FIG. 12A), whereby a small peak is also confirmed near gap=40.

Since the document edge has relatively little variation, the gap (≈4) with a large frequency is an accurate inclination amount of the document edge, and the gap (≈40) with a small frequency is an abnormal value (outlier). That is, the inclination amount detected in the inclination amount detection area 1 (see FIG. 12A) takes a value largely deviated from the actual document inclination amount, whereby it does not serve as a reference for shadow variation detection.

In view of the above, the first inclination group detecting unit 400 determines an inclination amount detection area to be used in the processing determination unit 330.

Accordingly, it becomes possible to correct the inclination while minimizing the erroneous correction even in the case where the document has curl, a fold, or the like.

However, depending on resolution of the processing system and the number of detection areas (number of samples), the frequency distribution may be flat (no peak is detected), and an appropriate mode value may not be obtained. For example, while the inclination amount is handled with 10-bit resolution (inclination amount in the sub-scanning direction with respect to 1,024 pixels in the document main-scanning direction) in the present embodiment, it may be difficult to extract a value as a mode value in the case of 12-bit resolution or larger than that.

In view of the above, the first inclination group detecting unit 400 may determine a class width corresponding to the number of inclination amount detection areas (number of samples) from the frequency distribution of the inclination amount group as a method of determining the inclination amount detection area, and may determine the area having a class value with the highest frequency as an inclination amount detection area. The mode value of the frequency distribution divided by class is a statistic not easily affected by an abnormal value (outlier), whereby accuracy can be expected. By increasing the resolution of the processing system in this manner, it becomes possible to extract the mode value even in the case where the mode value cannot be obtained. As a method of determining the class width and the class number from the inclination amount group, there is a method of simply using the Sturges formula "The problem with Sturges' rule for constructing histograms (Rob J. Hyndman, 1995)". This method is a method of obtaining the class number from k=log 2N+1 and obtaining the divided class number by dividing the data width (min value to max value) by the class number k, where n represents a sample size and k represents the class number.

Accordingly, it becomes possible to correct the inclination while minimizing the erroneous correction even in the case where the document has curl, a fold, or the like. Furthermore, even in the case where the resolution of the processing system increases and the frequency distribution is flat (no peak is detected) so that the mode value cannot be obtained, the mode value can be extracted by making a division with the class width.

Figure 13:
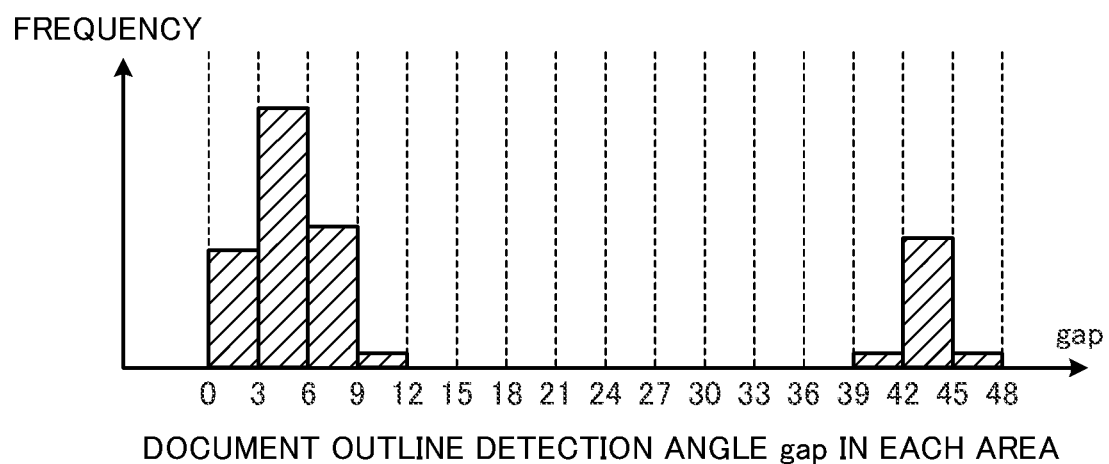
FIG. 13 is a graph illustrating exemplary frequency distribution divided by class.

FIG. 13 is a graph illustrating exemplary frequency distribution divided by class. In the example of FIG. 13, the frequency of the class value (3-6) is the largest, thereby determining the area having this inclination amount as a detection area. However, in a case where the number of detection areas (number of samples) is small, it may be difficult to extract a value as a mode value.

In view of the above, as a method of determining the inclination amount detection area, the first inclination group detecting unit 400 may obtain the median value from the frequency distribution of the inclination amount group, and may determine the area where the median value is obtained as a detection area. The median value is a statistic not easily affected by an abnormal value (outlier), whereby accuracy can be expected.

The median value is a statistic defined as a value located in the center when data is arranged in ascending order. Accordingly, even in the case where the number of detection areas (number of samples) is small, it becomes possible to detect an inclination amount with a large frequency although it is slightly affected by an abnormal value (outlier). Furthermore, there is no calculation cost for determining the class width corresponding to the number of detection areas (number of samples) from the frequency distribution.

Accordingly, it becomes possible to correct the inclination while minimizing the erroneous correction even in the case where the document has curl, a fold, or the like. Accordingly, even in the case where the number of detection areas (number of samples) is small, by using the median value, it becomes possible to detect an inclination amount with a large frequency although it is slightly affected by an abnormal value (outlier).

Furthermore, the first inclination group detecting unit 400 may perform removal of an abnormal value (outlier) on the frequency distribution of the inclination amount group as preparation for the detection area determining process.

Thereby, improvement in accuracy of statistical processing can be expected. As a method of detecting an abnormal value (outlier), there has been known iterative processing of the Smirnov-Grubbs' test. However, many of the methods of detecting an abnormal value (outlier) including this function on the assumption that the frequency distribution is normal distribution, whereby the method of detecting an abnormal value (outlier) is not limited to the present embodiment and, for example, only the maximum value and the minimum value may be removed.

The processing determination unit 330 receives output from the first inclination detecting unit 310, the second inclination detecting unit 320, and the first inclination group detecting unit 400. The processing determination unit 330 determines processing to be performed on the image data from the inclination amount obtained by calculating detection values input from the first inclination detecting unit 310, the second inclination detecting unit 320, and the first inclination group detecting unit 400 by predetermined algorithm.

The processing determination unit 330 calculates the variation of the inclination amount detection result (2) in the case where the inclination amount detection result (1) is used as a reference with respect to the determined inclination amount detection area, and determines processing by detecting whether there is variation such as curl, a fold, or the like at the document edge.

A method of detecting whether there is variation such as curl, a fold, or the like at the document edge uses, for example, an arithmetic expression that takes an absolute value of the inclination amount (1) and the inclination amount (2). The first inclination group detecting unit 400 determines the inclination amount detection result (2) of the detection area where the calculation result is the smallest as a document inclination amount.

The inclination correcting unit 340 performs the image processing determined by the processing determination unit 330 to detect the inclination of the document in the image data, corrects the detected inclination, and outputs the corrected image data to the subsequent stage.

Here, exemplary determination of the process to be performed on the image data, which is determined by the processing determination unit 330, will be described as an example.

For example, in a case where the absolute value of (1)-(2) is equal to or more than a predetermined value, the processing determination unit 330 notifies the inclination correcting unit 340 of a command not to perform correction. In this case, the inclination correcting unit 340 does not correct the inclination amount. Accordingly, it becomes possible to suppress erroneous correction in the case where the document has curl, a fold, or the like.

On the other hand, in a case where the absolute value of (1)-(2) is equal to or less than the predetermined value, the processing determination unit 330 notifies the inclination correcting unit 340 of a command to perform correction with the inclination amount detection result (2) of the second inclination detecting unit 320. In this case, the inclination correcting unit 340 performs correction with the inclination amount (2).

As described above, it becomes possible to provide, for all documents, a function of correcting the inclination amount without performing erroneous correction.

Next, an image reading process in the image processing apparatus 100 according to the present embodiment will be described.

Figure 14:
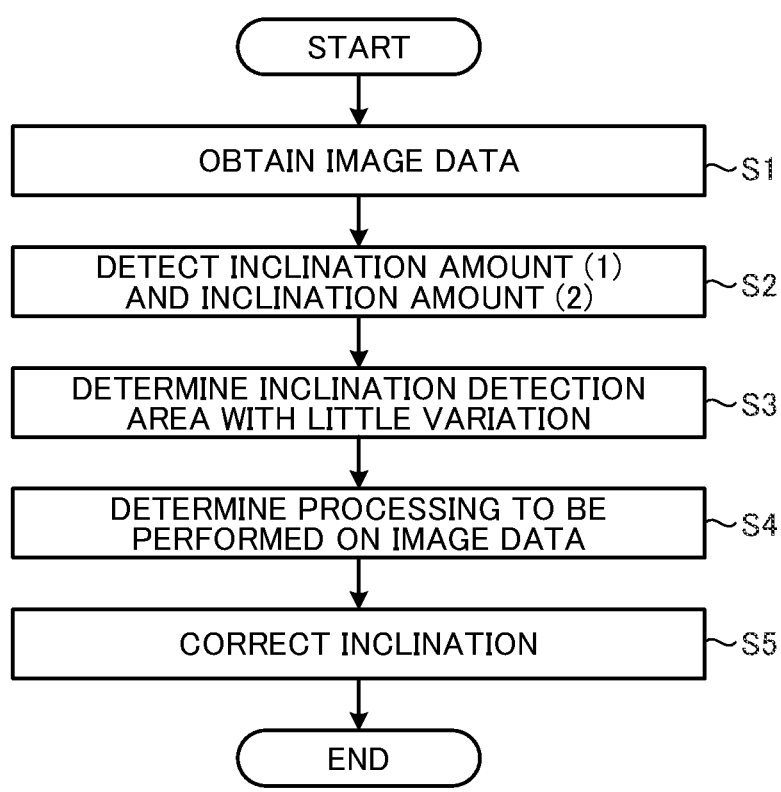
FIG. 14 is a flowchart schematically illustrating a flow of an image reading process.

Here, FIG. 14 is a flowchart schematically illustrating a flow of the image reading process. As illustrated in FIG. 14, when document conveyance is started by the ADF 102, the image processor 200 obtains image data obtained by the scanner 101 reading the document conveyed to, by the ADF 102, the slit glass 7 that is the reading position (step S1).

Subsequently, the image processor 200 (first inclination detecting unit 310 and second inclination detecting unit 320) detects the inclination amount (1) and the inclination amount (2) (step S2).

Subsequently, the image processor 200 (first inclination group detecting unit 400) determines an inclination amount detection area where variation of the document outline is small (step S3).

Subsequently, the image processor 200 (processing determination unit 330) determines a process to be performed on the image data from the inclination amount (1) and the inclination amount (2) calculated by the first inclination detecting unit 310 and the second inclination detecting unit 320 in the determined inclination amount detection area (step S4).

Subsequently, the image processor 200 (inclination correcting unit 340) executes the imaging process determined in step S4 to correct the inclination of the document in the image data, and outputs it to the subsequent stage as corrected image data (step S5).

As described above, according to the present embodiment, in order to detect the document outline, with the configuration in which the document skew and registration amounts are detected from two types of edge detection results including the boundary (shadow edge of the document) between the background area and the shadow area and the boundary (document edge) between the shadow area and the document area, the detection area is divided into a plurality of areas, one or more areas with small document damage are determined on the basis of the statistic of the document edge detected for each area, and correction processing is determined from the difference between the two detection results of the shadow edge and the document edge detected in the area. As a result, accuracy in skew and registration correction can be improved, erroneous detection can be suppressed even in the case of a high-density document in which the document edge may not be detected, and accuracy in electric skew correction can be improved.

Note that, although the inclination amount is detected using the upper side in the image data in the present embodiment, it is not limited thereto, and the inclination amount may be detected using the lower side in the image data.

In addition, although the inclination amount detection with respect to the main-scanning direction of the document edge has been described in the present embodiment, the processing may be inclination amount detection with respect to the sub-scanning direction.

Second Embodiment

Next, a second embodiment will be described.

The second embodiment is different from the first embodiment in that an inclination amount with respect to the main-scanning direction is detected using the upper side or the lower side, and also an inclination amount with respect to the sub-scanning direction is detected using a vertical side. Hereinafter, in the descriptions of the second embodiment, descriptions of the same part as a part of the first embodiment will be omitted, and parts different from the first embodiment will be described.

Figure 15:
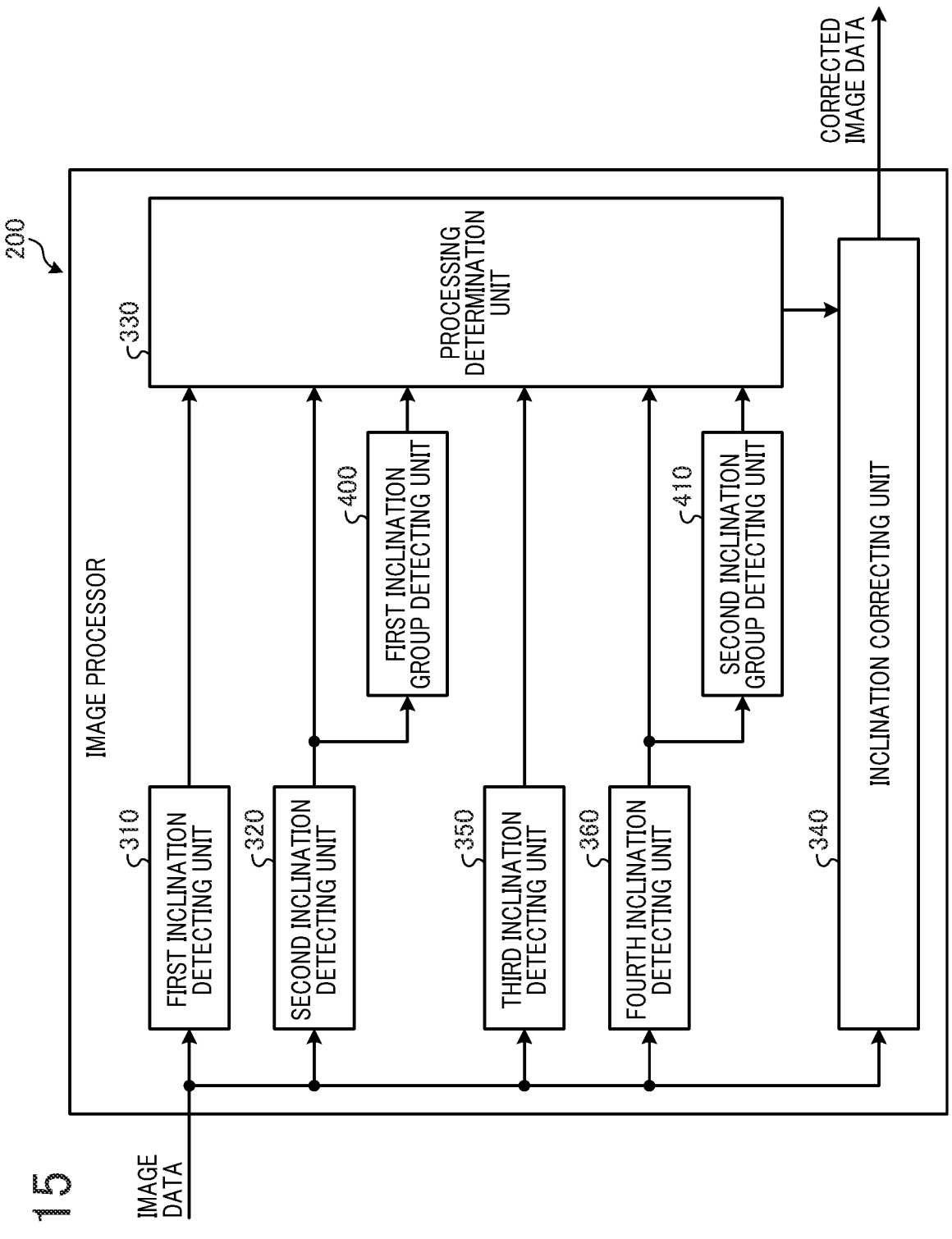
FIG. 15 is a block diagram illustrating functions of an image processor according to a second embodiment.

FIG. 15 is a block diagram illustrating functions of an image processor 200 according to the second embodiment. As illustrated in FIG. 15, the image processor 200 includes, in addition to an image generating unit 300, a first inclination detecting unit 310, a second inclination detecting unit 320, a processing determination unit 330, an inclination correcting unit 340, and a first inclination group detecting unit 400, a third inclination detecting unit 350 that functions as a first boundary detecting unit, a fourth inclination detecting unit 360 that functions as a second boundary detecting unit, and a second inclination group detecting unit 410 that functions as a boundary group detecting unit. The third inclination detecting unit 350, the fourth inclination detecting unit 360, and the second inclination group detecting unit 410 are included in a controller ASIC 208. Note that the present disclosure is not limited thereto, and the third inclination detecting unit 350, the fourth inclination detecting unit 360, and the second inclination group detecting unit 410 may be implemented by a CPU 201 executing a program.

The first inclination detecting unit 310 extracts, using the method of detecting a boundary illustrated in FIGS. 9A and 9B, boundary pixels within a range of a predetermined number of lines from the upper side in the image data including the background area, detects a boundary between the background area and the shadow area, and detects an inclination amount of the document from the detection result of the boundary.

The second inclination detecting unit 320 extracts, using the method of detecting a boundary illustrated in FIGS. 9A and 9B, boundary pixels within a range of a predetermined number of lines from the upper side in the image data including the background area, detects a boundary between the shadow area and the document area, and detects an inclination amount of the document from the detection result of the boundary. The output of the second inclination detecting unit 320 is further input to the first inclination group detecting unit 400.

The first inclination group detecting unit 400 determines an inclination amount detection area to be used in the processing determination unit 330 from the inclination amount group formed by detection results of the second inclination detecting unit 320 at a plurality of detection positions.

The third inclination detecting unit 350 extracts, using the method of detecting a boundary illustrated in FIGS. 9A and 9B, boundary pixels within a range of a predetermined number of lines from the left vertical side in the image data including the background area, detects a boundary between the background area and the shadow area, and detects an inclination amount of the document from the detection result of the boundary.

The fourth inclination detecting unit 360 extracts, using the method of detecting a boundary illustrated in FIGS. 9A and 9B, boundary pixels within a range of a predetermined number of lines from the left vertical side in the image data, detects a boundary between the shadow area and the document area, and detects an inclination amount of the document from the detection result of the boundary. The output of the fourth inclination detecting unit 360 is further input to the second inclination group detecting unit 410.

The second inclination group detecting unit 410 determines an inclination amount detection area to be used in the processing determination unit 330 from the inclination amount group based on the boundary group as detection results of the fourth inclination detecting unit 360 at a plurality of detection positions.

The processing determination unit 330 receives output from the first inclination detecting unit 310, the second inclination detecting unit 320, and the first inclination group detecting unit 400. Furthermore, the processing determination unit 330 receives output from the third inclination detecting unit 350, the fourth inclination detecting unit 360, and the second inclination group detecting unit 410. The processing determination unit 330 determines processing to be performed on the image data from the inclination amount obtained by calculating detection values input from the first inclination detecting unit 310, the second inclination detecting unit 320, and the first inclination group detecting unit 400, and detection values input from the third inclination detecting unit 350, the fourth inclination detecting unit 360, and the second inclination group detecting unit 410 by predetermined algorithm.

The inclination correcting unit 340 performs the image process determined by the processing determination unit 330 to correct the inclination of the document in the image data, and outputs it to the subsequent stage as corrected image data.

As described above, according to the present embodiment, in the case where stability of the outlines in both the main-scanning direction and the sub-scanning direction is high due to the device configuration of a scanner 101, an inclination amount is detected from both of the outlines, whereby accuracy in detection can be improved. In addition, the outline in the sub-scanning direction is detected, whereby main scanning registration can be corrected with high accuracy.

Note that, although the scanner 101, the ADF 102, and the image processor 200 have been used as the inclination detecting device and inclination detection of an object to be inspected (document) at the time of conveyance has been described in the respective embodiments described above, the present disclosure is no limited thereto. For example, the inclination detecting device according to each of the embodiments can be applied to inclination detection of an object to be inspected of a factory automation (FA) inspection apparatus.

Furthermore, although an object to be detected (document) is conveyed and an image is obtained by the fixed imaging device 28 in each of the embodiments described above, in an opposite manner, the object to be detected (document) in a stopped state may be moved by the imaging device 28 to detect the inclination of the object to be detected (document).

Note that, although the exemplary case where the image processing apparatus according to an embodiment of the present disclosure is applied to a multifunction peripheral having at least two functions of the copy function, printer function, scanner function, and facsimile function has been described in each of the embodiments described above, it can be applied to any image processing apparatus such as a copier, printer, scanner, and facsimile device.

While several embodiments of the present disclosure have been described above, the specific configuration of each part, the contents of processing, the data format, and the like are not limited to those described in the embodiments. It goes without saying that the configurations of the embodiments described above can be implemented in any combination as long as they do not contradict each other.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An inclination detecting device comprising:
processing circuitry configured to:
   detect, in image information that is an image of an object imaged by an imaging device at an imaging position where a background member forms a background, a first boundary between the background member and a shadow of the object at a plurality of detection positions in at least one of a main-scanning direction and a sub-scanning direction on an outline of the object;
   detect a second boundary between the object and the shadow of the object at a plurality of detection positions in at least one of the main-scanning direction and the sub-scanning direction on the outline of the object in the image information;
   detect a boundary group including detection results of the second boundary at the plurality of detection positions; and
   detect an inclination of the object in the image information from detection results of the first boundary, the second boundary, and the boundary group.

2. A reading device comprising:
an imaging device configured to image an object at an imaging position where a background member forms a background;
processing circuitry configured to:
   detect, in image information that is an image of the object imaged by the imaging device, a first boundary between the background member and a shadow of the object at a plurality of detection positions in at least one of a main-scanning direction and a sub-scanning direction on an outline of the object;
   detect a second boundary between the object and the shadow of the object at a plurality of detection positions in at least one of the main-scanning direction and the sub-scanning direction on the outline of the object in the image information;
   detect a boundary group including detection results of the second boundary at the plurality of detection positions; and
   detect an inclination of the object in the image information from detection results of the first boundary, the second boundary, and the boundary group.

3. The reading device according to claim 2, wherein the processing circuitry detects the first boundary and the second boundary from the outline of the object in the main-scanning direction, detect an inclination amount of the object from detection results of the first boundary and the second boundary, detect the first boundary and the second boundary from the outline of the object in the sub-scanning direction, and detect an inclination amount of the object from detection results of the first boundary and the second boundary.

4. The reading device according to claim 3, wherein the processing circuitry determines processing to be performed on the image information from the inclination amount detected from the first boundary and the second boundary.

5. The reading device according to claim 2, wherein the processing circuitry sets an area in which a mode value is obtained in a frequency distribution including an inclination amount group based on the boundary group to a boundary detection area for the first boundary and the second boundary.

6. The reading device according to claim 5, wherein the processing circuitry performs removal of an abnormal value on the frequency distribution including the inclination amount group based on the boundary group.

7. The reading device according to claim 2,
wherein the processing circuitry determines a class width corresponding to a number of boundary detection areas from a frequency distribution including an inclination amount group based on the boundary group, and sets an area having a class value with a largest frequency to a boundary detection area for the first boundary and the second boundary.

8. The reading device according to claim 2,
wherein the processing circuitry obtains a median value from a frequency distribution including an inclination amount group based on the boundary group and determines an area in which the median value is obtained as a boundary detection area.

9. An image processing apparatus comprising:
the reading device according to claim 2; and
an image forming device configured to form an image on basis of the image information read by the reading device.

10. A method of detecting an inclination, the method comprising:
first detecting, in image information that is an image of an object imaged by an imaging device at an imaging position where a background member forms a background, a first boundary between the background member and a shadow of the object at a plurality of detection positions in at least one of a main-scanning direction and a sub-scanning direction on an outline of the object;
second detecting a second boundary between the object and the shadow of the object at a plurality of detection positions in at least one of the main-scanning direction and the sub-scanning direction on the outline of the object in the image information;
third detecting a boundary group including detection results of the second boundary at the plurality of detection positions; and
detecting an inclination of the object in the image information from detection results obtained in the first detecting, the second detecting, and the third detecting.

\* \* \* \* \*